United States Patent
Liew et al.

(10) Patent No.: US 11,112,884 B1
(45) Date of Patent: Sep. 7, 2021

(54) OPTICAL NAVIGATION SCHEME CAPABLE OF SAVING MORE POWER BASED ON VARIABLE FRAME RATE AS WELL AS OUTPUTTING ENOUGH DISPLACEMENT/POSITION DATA TO ACHIEVE PRECISE MOTION TRACKING

(71) Applicant: PixArt Imaging Inc., Hsin-Chu (TW)

(72) Inventors: Tong Sen Liew, Penang (MY); Chun Heap Leow, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/075,662

(22) Filed: Oct. 20, 2020

(51) Int. Cl.
  *G06F 3/03* (2006.01)

(52) U.S. Cl.
  CPC .......... *G06F 3/0325* (2013.01); *G06F 3/0308* (2013.01)

(58) Field of Classification Search
  None
  See application file for complete search history.

(56) References Cited

U.S. PATENT DOCUMENTS

| | | | |
|---|---|---|---|
| 2005/0190158 A1* | 9/2005 | Casebolt | G06F 3/0317 345/166 |
| 2013/0229514 A1* | 9/2013 | Huang | G06F 3/03547 348/140 |
| 2015/0301618 A1* | 10/2015 | Tan | G06F 3/03543 345/166 |

* cited by examiner

*Primary Examiner* — Matthew Yeung
(74) *Attorney, Agent, or Firm* — Winston Hsu (57) ABSTRACT

A method applied into an optical navigation device, used to communicate with a remote computer device based on a transmission interface, includes: capturing image frames according to a specific frame rate to obtain actual displacement data corresponding to the captured image frames, the specific frame rate being lower than a specific reporting rate specified by the transmission interface; generating predicted displacement data based on the actual displacement data; using the actual displacement data and the predicted displacement data to form resultant displacement data which is to be outputted; and outputting the resultant displacement data to the remote computer device based on the specific reporting rate specified by the transmission interface.

17 Claims, 6 Drawing Sheets

OPTICAL NAVIGATION SCHEME CAPABLE OF SAVING MORE POWER BASED ON VARIABLE FRAME RATE AS WELL AS OUTPUTTING ENOUGH DISPLACEMENT/POSITION DATA TO ACHIEVE PRECISE MOTION TRACKING

BACKGROUND OF THE INVENTION

1. Field of the Invention

The invention relates to an optical navigation device, and more particularly to an optical navigation device, an optical sensor device, and a method applied into an optical navigation device.

2. Description of the Prior Art

Generally speaking, the minimum frame rate of a conventional optical navigation device (more particularly to a high performance gaming mouse device) nowadays is normally clipped at 1 Kfps, which is same as high performance gaming mouse USB reporting rate of 1 ms to maintain the consistency of delta reporting. The minimum frame rate of 1 Kfps has limited the gaming sensor capability to achieve lower power at low speed.

SUMMARY OF THE INVENTION

Therefore one of the objectives of the invention is to provide an optical navigation device and an optical sensor device to solve the above-mentioned problems.

According to embodiments of the invention, an optical navigation device which is used to communicate with a remote computer device based on a transmission interface is disclosed. The optical navigation device comprises a controller and an optical sensor device. The controller is coupled to the remote computer device via the transmission interface, and it is used for outputting resultant displacement data generated by an optical sensor device to the remote computer device based on a specific reporting rate specified by the transmission interface. The optical sensor device is coupled to the controller, and it is used for generating the resultant displacement data according to a specific frame rate and then outputting the resultant displacement data to the controller. The specific frame rate is lower than the specific reporting rate specified by the transmission interface. The optical sensor device is capable of capturing image frames according to the specific frame rate to obtain actual displacement data corresponding to the captured image frames, generating predicted displacement data based on the actual displacement data, and using the actual displacement data and the predicted displacement data to form the resultant displacement data which is to be outputted to the controller.

According to the embodiments, an optical sensor device, to be used in an optical navigation device which is used to communicate with a remote computer device based on a transmission interface, is disclosed. The optical sensor device comprises a sensing unit and a processing circuit. The sensing unit is used for receiving and sensing reflected light from a surface on which the optical navigation device moves with a specific flash rate which is lower than a specific reporting rate of the transmission interface. The processing circuit is coupled to the light emitting unit, and it is used for capturing image frames with a specific frame rate to generate actual displacement data and generating predicted displacement data to form resultant displacement data which are to be outputted from the optical navigation device to the remote computer device.

According to the embodiments, a method applied into an optical navigation device, used to communicate with a remote computer device based on a transmission interface, is further disclosed. The method comprises: capturing image frames according to a specific frame rate to obtain actual displacement data corresponding to the captured image frames wherein the specific frame rate is adjusted to be lower than a specific reporting rate specified by the transmission interface; generating predicted displacement data based on the actual displacement data; using the actual displacement data and the predicted displacement data to form resultant displacement data which is to be outputted; and outputting the resultant displacement data to the remote computer device based on the specific reporting rate specified by the transmission interface.

The embodiments of this invention disclosure is to propose a new optical navigation low speed interpolation/extrapolation algorithm/scheme to enable a high performance gaming sensor to operate below the frame rate (e.g. 1 Kfps) corresponding to the minimum/negotiated reporting rate limitation while maintain delta reporting consistency.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a novel optical navigation device which is capable of supporting one or more operation modes corresponding to requirements of different polling/reporting rates (or minimum polling/reporting rates) which are respectively specified by an intermediate transmission interface (e.g. USB communication interface) between the optical navigation device and a remote computer device such as a host personal computer.

In one or each operation mode, the novel optical navigation device can decide capturing frames with an adjustable/variable frame rate (VFR), which is higher than or substantially equal/equivalent to the minimum polling rate, to generate displacement/position data and then to report the displacement/position data to the remote computer device via the USB communication interface based on the specified polling rate. In addition, the novel optical navigation device can be arranged to capture frames with the variable frame rate which is lower than the above-mentioned polling rate (or minimum polling rate) to save more power as well as in this situation can generate predicted displacement data to use actual displacement data with the predicted displacement data to form resultant displacement data and then to report the resultant displacement data to the remote computer device via the USB communication interface based on the specified polling rate.

The optical navigation device for example may be an optical navigation mouse device. The operation mode(s) may comprise a high speed tracking mode with the requirement of a higher polling rate such as a rate higher than or equal to 1 KHz (but not limited) and a power saving mode with the requirement of a lower polling rate such as a rate lower than 1 KHz. The transmission interface for example is an USB transmission interface which defines/specifies the higher polling rate and lower polling rate requirement.

In each operation mode (either the high speed tracking mode or power saving mode), the optical navigation device can be arranged to predict the displacement/motion of the optical navigation device to generate predicted displacement data and combine the predicted displacement data with actual displacement data directly generated from the captured image(s) to form resultant displacement data wherein the data amount of the formed resultant displacement data meets that of the higher frame report rate requirement defined in the high speed tracking mode so that the optical navigation device can lower its frame rate and the rate of light emission/flash to save more power. This is more useful in the high speed tracking mode to save more power. For example, in the high speed tracking mode, the higher frame report rate requirement usually defines that the minimum reporting rate is equal to 1 KHz (but not limited). It should be noted that to save more power in the high speed tracking mode, the optical navigation device may lower its variable frame rate but not lower the requirement of the minimum polling rate.

Figure 1:
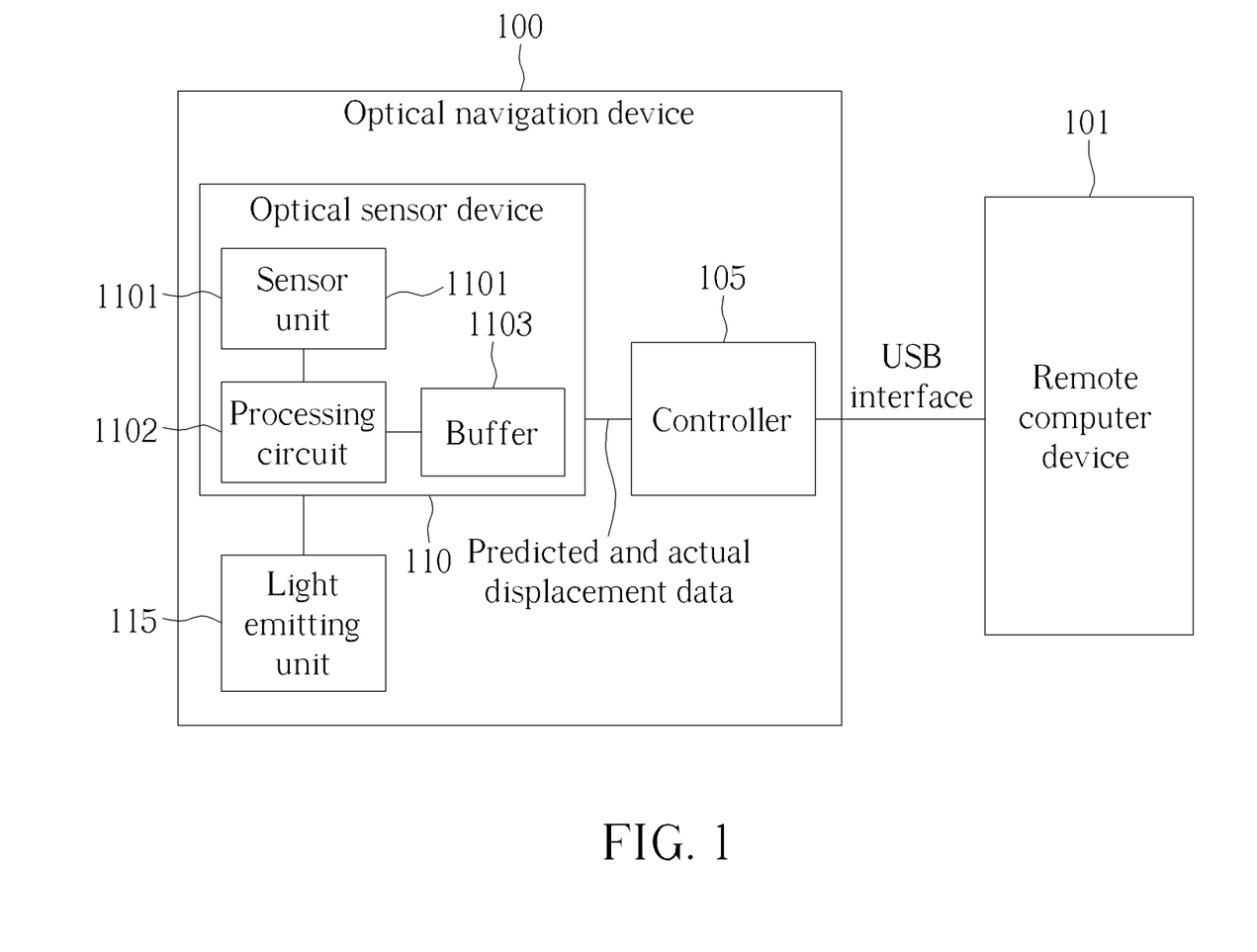
FIG. 1 is a block diagram of an optical navigation device used to communicate with a remote computer device 101 based on a transmission interface such as USB transmission interface according to an embodiment of the invention.

FIG. 1 is a block diagram of an optical navigation device 100 used to communicate with a remote computer device 101 based on a transmission interface such as USB transmission interface (but not limited) according to an embodiment of the invention. The optical navigation device 100 for example is an optical navigation tracking mouse device such as a gaming mouse device with a high speed performance (but not limited), and the remote computer device 101 is a host device, e.g. a personal computer, which can polling the optical navigation device 100 by periodically send a polling request to the optical navigation device 100 via USB transmission interface to make the optical navigation device 100 report displacement/position data of the optical navigation device 100. For example, the minimum polling rate may be needed to be at least 1 KHz, and the optical navigation device 100 needs to report the displacement data to the remote computer device 101 via the USB transmission interface every one millisecond (1 ms) at least; however, this is not intended to be a limitation.

The optical navigation device 100 comprises a controller 105 such as microcontroller (MCU), an optical sensor device 110, and a light emitting unit 115 such as light emitting diode (LED). The optical sensor device 110 comprises a sensor unit 1101, a processing circuit 1102, and a buffer 1103. The controller 105 is coupled to the remote computer device 101 via the USB transmission interface. The optical sensor device 110 is coupled to the controller 105 and is also coupled to the light emitting unit 115. The processing circuit 1102 is coupled to the sensor unit 1101 and is also coupled to the buffer 1103. The optical sensor device 110 is coupled to the controller 105 and is used for generating the resultant displacement data according to an adjustable/variable frame rate and then outputting the resultant displacement data to the controller 105. The adjustable/variable frame rate is lower than the specific polling rate specified by the USB transmission interface. The optical sensor device 110 is capable of capturing image frames according to the adjustable/variable frame rate to obtain actual displacement data corresponding to the captured image frames, predicting and generating another displacement data based on the actual displacement data, and using the actual displacement data and the predicted displacement data to form the resultant displacement data which is to be outputted to the controller 105.

In one embodiment, for the start of one or each frame, the processing circuit 1102 controls and pulses the light emitting unit 115 with a current to make the light emitting unit 115 emit/flash light to a working surface on which the optical navigation device 100 moves; that is, the flash rate or light emitting rate is equal to or matched to the frame rate. Alternatively, in another embodiment, for a portion of frames, the processing circuit 1102 may not pulse the light emitting unit 115 with a current to flash light; that is, the flash rate or light emitting rate may be lower than the frame rate, and this can be dynamically controlled by the processing circuit 1102. All the modifications fall within the scope of the invention.

The processing circuit 1102 then controls the sensor unit 1101 receiving and sensing reflected light from the working surface to capture frame(s) or image(s). The processing circuit 1102 then performs digital signal processing (DSP) and executes navigation engine/operation to generate actual displacement data according to the captured frame(s) wherein the engine may be hardware, software, or a combination thereof. The actual displacement data generated by the processing circuit 1102 is then transmitted to and stored/buffered in the buffer 1103. In addition, the processing circuit 1102 if needed may predict and generate displacement data for one time or for multiple times after generating the actual displacement data, and the predicted displacement data is then transmitted to the buffer 1103 to update the actual displacement data or update previously predicted displacement data stored in the buffer 1103.

In practice, a set of the actual displacement data may comprise two actual delta values associated of two-dimensions (i.e. delta-X and delta-Y) corresponding to the actual motion difference values of two-dimensions X-axis and Y-axis, corresponding to two actual motion average difference values of two-dimensions X-axis and Y-axis, or corresponding to combinations of the actual motion difference values and the actual motion average difference values. Similarly, a set of the predicted displacement data may comprise two predicted delta values associated of two-dimensions (i.e. delta-X and delta-Y) corresponding to two predicted displacement motion difference values of two-dimensions X-axis and Y-axis, corresponding to two predicted displacement motion average difference values of two-dimensions X-axis and Y-axis, or corresponding to combinations of the predicted motion difference values and the predicted motion average difference values. The modifications are not meant to be a limitation.

The controller 105 may obtain or get the displacement data currently stored in the buffer 1103 to use the obtained data information as the resultant displacement data (i.e. the resultant data may be actual data or formed by the actual data combined with (i.e. updated by) the predicted data) so as to output the resultant displacement data to the remote computer device 101 based on the specific polling rate (or minimum polling rate) specified by the USB transmission interface. For example (but not limited), the controller 105 may obtain or get the information of displacement data currently stored in the buffer 1103 every one millisecond due to the minimum polling rate 1 KHz of USB transmission interface.

The processing circuit 1102 can generate enough actual displacement data to the buffer 1103 with the variable frame rate which is higher than the minimum polling rate or specific polling rate specified in the USB transmission interface, and can also generate actual displacement data with the variable frame rate which is lower than the minimum polling rate or specific polling rate as well as further predict enough displacement data to update the actual displacement data so as to equivalently form enough resultant displacement data to timely or instantly reflect the position or motion of the optical navigation device 100.

That is, to save more power, both the rate of generating the actual displacement data and the light emitting rate in average may be lower than the minimum polling rate or specific/negotiated polling rate (i.e. reporting rate), and the rate of generating the actual displacement data plus calculating the predicted displacement data is matched to or equal to the minimum polling rate or specific/negotiated polling rate. This means that the updated information of displacement data currently stored in the buffer 1103 is timely or averagely available for the controller 105 (or for the remote computer device 101) to precisely reflect the motion of the optical navigation device 100.

Figure 2:
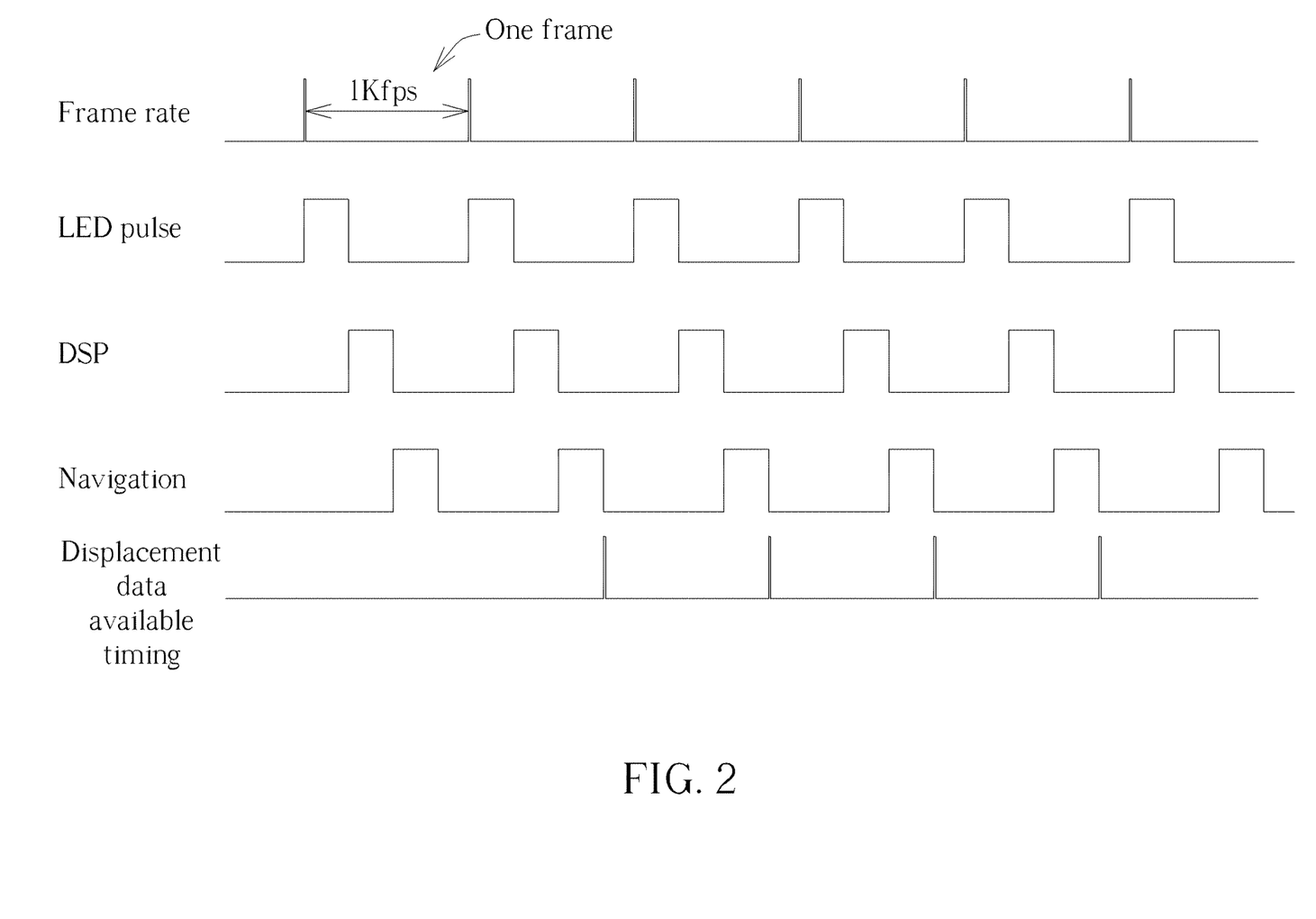
FIG. 2 is a diagram showing an example of the optical navigation device of FIG. 1 operating under a high speed tracking mode (or power saving mode) according to an embodiment of the invention.

FIG. 2 is a diagram showing an example of the optical navigation device (e.g. a high performance gaming mouse) 100 operating under a high speed tracking mode according to an embodiment of the invention. The minimum polling rate specified in the USB transmission interface is set as 1 KHz, and in this example the optical navigation device 100 can be arranged to control the optical sensor device 110 operating with the frame rate (equal to or matched to the minimum polling rate) to capture image(s) so as to generate and store enough actual displacement data into the buffer 1103. The frame rate for example may be kept at 1 Kfps (frames per second) to maintain consistence delta reporting with USB's polling rate corresponding to the reporting of every 1 ms (millisecond).

At the start of one or every frame, the optical sensor device 105 is arranged to pulse the light emitting unit 115 with a current to flash light to the working surface so as to make the sensor 1101 receive and sense the reflected light from such working surface which the optical navigation device 100 is placed on, to acquire image(s). LED pulses, illustrated in FIG. 1, respectively show the operation periods for controlling the light emitting unit 115 to be pulsed with a current for different frames. Then, after the light sensing is finished, the processing circuit 1102 performs digital signal processing (DSP) upon and performs/uses the navigation engine to calculate the delta values (i.e. the actual motion difference values, motion average difference values, or corresponding combinations for X-axis and Y-axis) which are to be stored in the buffer 1103. The actual delta values are available for the controller 105 when each time the execution of navigation engine is finished (i.e. at the end of navigation operation and before the end of such frame). The impulse signals shown at the signal line for displacement delta are used to indicate that the displacement data (i.e. delta values) stored in the buffer 1103 becomes available at the timings associated with the impulse signals; this is not a limitation of the invention. Further, in the example of FIG. 2, the processing circuit 1102 decides not lowering down the variable frame rate, and the rate of generating actual displacement data based on the captured frames is matched to the minimum polling rate.

In another embodiment, to save more power of the battery of the optical navigation device 100, the processing circuit 1102 lowers down the variable frame rate to a lower frame rate to equivalently decrease the flash rate of the light emitting unit 115 as well as further generating or calculating the predicted displacement data (i.e. predicted delta values) to update information/value of the actual displacement data generated from the captured frame due to the lower flash rate. The processing circuit 1102 can control the specific flash rate be matched to or be lower than the specific reporting rate of the transmission interface, i.e. the polling rate or minimum polling rate in either the high speed tracking mode or the power saving mode.

In practice, to dynamically determine the value of the lower variable frame rate, the optical navigation device 100 (or processing circuit 1102) is arranged to detect or predict the moving speed of optical navigation device 100 on the working surface based on a currently used (i.e. the previously adjusted) frame rate so as to determine the actual value of the variable frame rate which is enough to effectively track the motion of the optical navigation device 100 as well as capable of effectively saving more power of the optical navigation device 100. For example, the following table shows the different examples of the relation between the current consumption, frame rate, and moving speed of the optical navigation device 100 according to an embodiment of the invention:

| Mode | Speed (ips) | Frame rate (Kfps) | Current consumption (mA) |
|---|---|---|---|
| Run (high speed tracking) | 1 | 0.6 | 0.442 |
| | 5 | 0.6 | 0.443 |
| | 10 | 0.8 | 0.611 |
| | 15 | 1 | 0.785 |
| | 20 | 1.3 | 1.006 |
| | 25 | 1.6 | 1.23 |
| | 30 | 2 | 1.451 |

As shown above, the moving speed (or average moving speed) of the optical navigation device 100 may range from 1ips (one inch per second) to 30 ips (thirty inches per second); this is not meant to be a limitation. In response to the different moving speeds, to still be able to effectively track the motion of the optical navigation device 100, the optical navigation device 100 is capable of running with different frame rates which may range from 0.6 Kfps (i.e. 600 frames per second) to 2 Kfps (i.e. 2000 frames per second); however, this is not meant to be a limitation. That is, in response to different moving speeds, the optical navigation device 100 (or processing circuit 1102) can control/adjust the variable frame rate to make the variable frame rate become smaller, e.g. a rate smaller than the minimum polling rate 1 KHz. For example, when the moving speed becomes smaller (e.g. lips, 5 ips, or 10 ips), the processing circuit 1102 can adjust its variable frame rate to 0.6 Kfps or to 0.8 Kfps. The current consumption of the battery of the optical navigation device 100 is almost dominated by and also almost proportional to the rate of the light emission, which is almost proportional to the variable frame rate. Thus, under a condition of being still able to effectively track the motion, dynamically adjusting the variable frame rate to the different lower rates based on the different situations can effectively reduce the current consumption and save more power of the battery. Compared to the conventional scheme, the current consumption of the novel optical navigation device 100 can be lowered down to 0.611 mA or 0.443 mA which is significantly smaller than 0.785 mA corresponding to the conventional condition of the minimum frame rate being kept at 1 Kfps.

Figure 3:
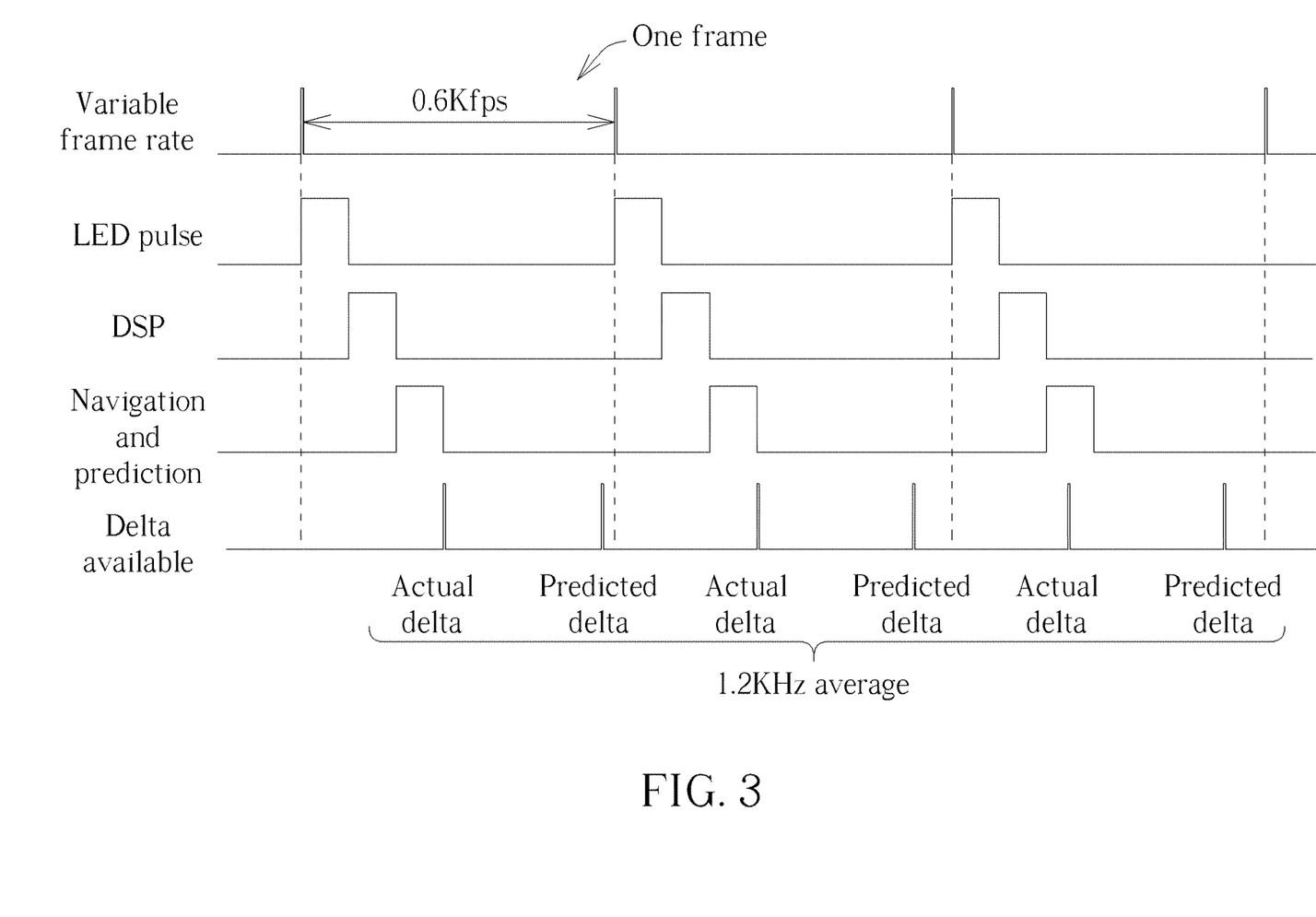
FIG. 3 is a diagram showing another example of the optical navigation device of FIG. 1 operating under a high speed tracking mode (or power saving mode) according to an embodiment of the invention.

FIG. 3 is a diagram showing another example of the optical navigation device 100 operating under a high speed tracking mode according to an embodiment of the invention. In this example, the optical navigation device 100 can be arranged to control the optical sensor device 110 operating with an adjustable/variable frame rate to capture image(s) to generate actual displacement data and then predict another displacement data based on the actual displacement data so as to generate enough displacement data for the controller 105. For example (but not limited), the variable frame rate may be adjusted to 0.6 Kfps while the polling rate of the USB transmission interface may be negotiated to kept at 1.2 Kfps. That is, the variable frame rate can be adjusted to a half of the negotiated polling rate. In another example, the variable frame rate may be adjusted to 500 fps, i.e. a half of the minimum polling rate 1 KHz. These modifications all fall within the scope of the invention.

As shown in FIG. 3, for example, when the optical navigation device 100 moves on the working surface slowly (it may detect its moving speed which may be lips (but not limited), the variable frame rate can be decreased and adjusted to a lower frame rate such as 600 fps which can be effectively used to tracking the motion of the optical navigation device 100 when moving at the speed lips. At the start of one or every frame corresponding to 600 fps, the processing circuit 1102 controls the light emitting unit 115 be pulsed with a current so as to make the sensor unit 1101 capture/acquire a frame/image, then performs DSP and navigation engine to calculate the actual delta values. At the end of navigation engine's execution of one or each frame, the processing circuit 1102 generates one set of actual delta values to the buffer 1103 so as to update the information/value(s) of displacement data stored in the buffer 1103, and thus the data of delta values is available at the end of navigation engine's execution. During a time period between the end of navigation engine's execution and the end of one or the each frame, the processing circuit 1102 predicts and generates one set of estimated delta values to the buffer 1103 so as to update the information/value(s) of displacement data stored in the buffer 1103, and thus the data of predicted delta values at this timing also becomes available for the data reading of controller 105. Equivalently, in this example the processing circuit 1102 is used to insert a set of predicted delta/displacement values between any two consecutive sets of actual delta/displacement values generated due to the image frames captured by the optical sensor device 110. Further, it should be noted that the impulse signals shown at the signal line for displacement delta are used to indicate that the displacement data stored in the buffer 1103 becomes available at the timings associated with the impulse signals on FIG. 3. The rate of generating the actual delta values plus generating the predicted delta values is equal to 1.2 KHz in average which is at least higher than the minimum polling rate 1 KHz or matched to the negotiated polling rate 1.2 KHz in this example. However, this is not intended to be a limitation.

Figure 4:
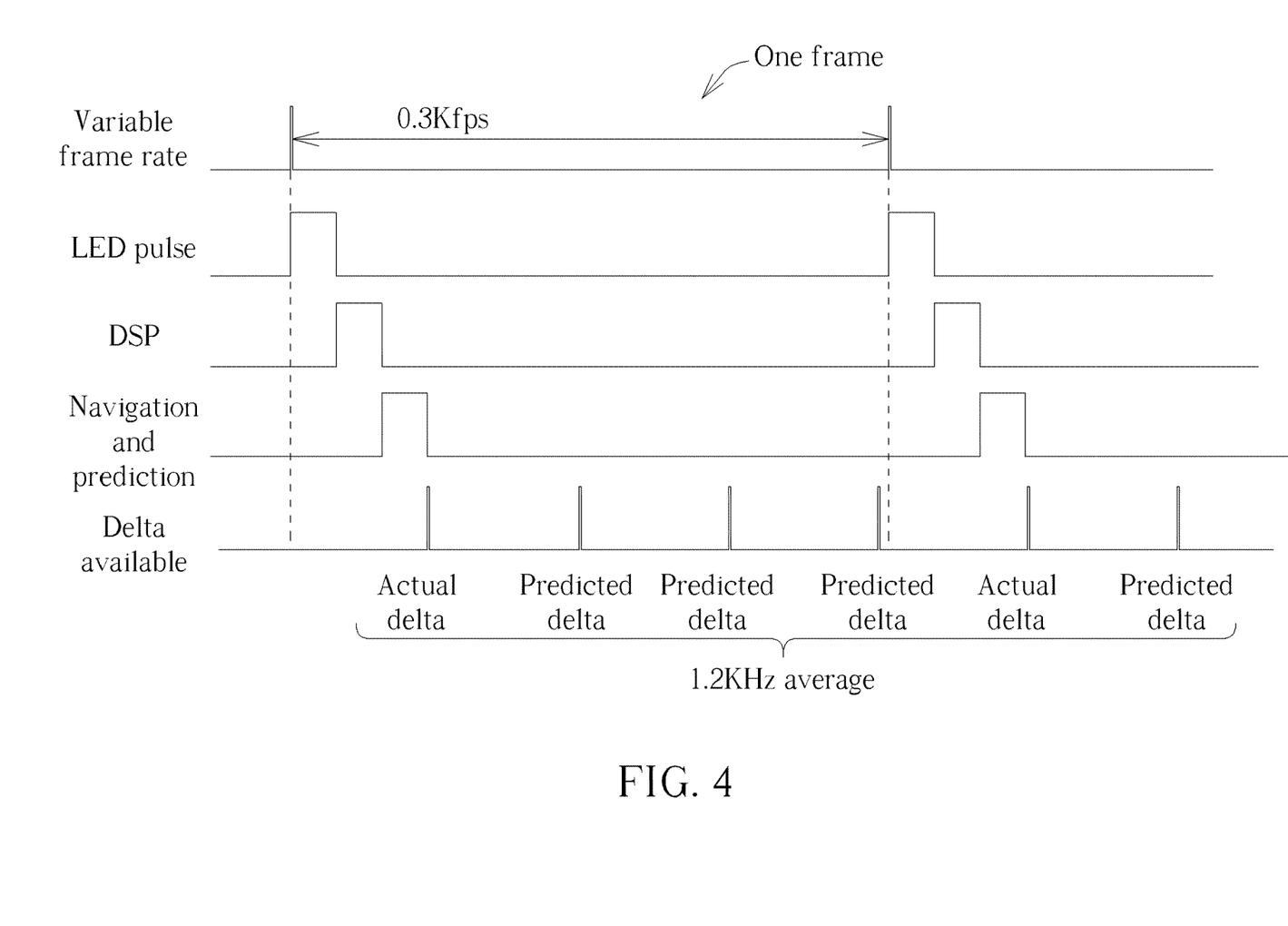
FIG. 4 is a diagram showing a third of the optical navigation device of FIG. 1 operating under a high speed tracking mode (or power saving mode) according to an embodiment of the invention.

Further, in another embodiment, the variable frame rate can be adjusted to another different frame rate $$\frac{M}{N} \times PR$$

wherein the value M is a positive integer smaller than the integer N and PR means the negotiated polling rate (or minimum polling rate) defined in the USB transmission interface. For example, after detecting the moving speed, the optical navigation device 100 (or processing circuit 1102) based the detected moving speed may determine to set M as 1 and N as 4 to reduce the power consumption as well as being still able to effectively track the motion of the optical navigation device 100, and thus the variable frame rate in this example is equal to 0.25×PR=300 fps if the negotiated polling rate PR is equal to 1.2 KHz. Accordingly, the optical sensor device 110 is arranged to predict and generate more estimated delta data in every frame. In this example, the optical sensor device 110 may generate three sets of estimated delta values (but not limited) which sequentially follow one set of actual delta values for every frame so as to make the information of displacement data stored in the buffer 1103 can be updated (i.e. available) at the rate of 1.2 KHz in average, as shown in FIG. 4. Equivalently, in this embodiment the processing circuit 1102 is used to insert three sets of predicted delta/displacement values between any two consecutive sets of actual delta/displacement values generated due to the image frames captured by the optical sensor device 110.

Figure 5:
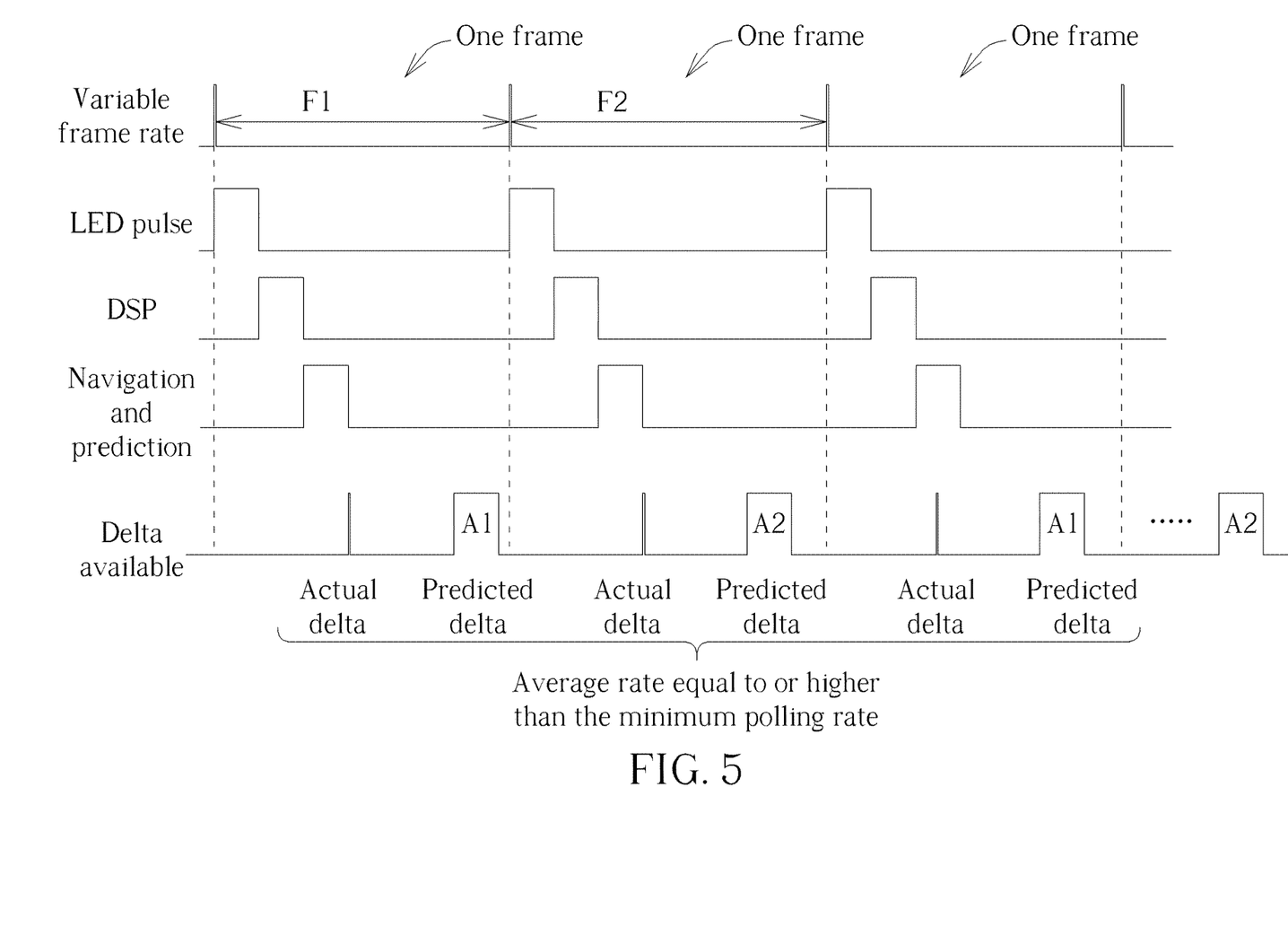
FIG. 5 is a diagram showing a fourth of the optical navigation device of FIG. 1 operating under a high speed tracking mode (or power saving mode) according to an embodiment of the invention.
Figure 6:
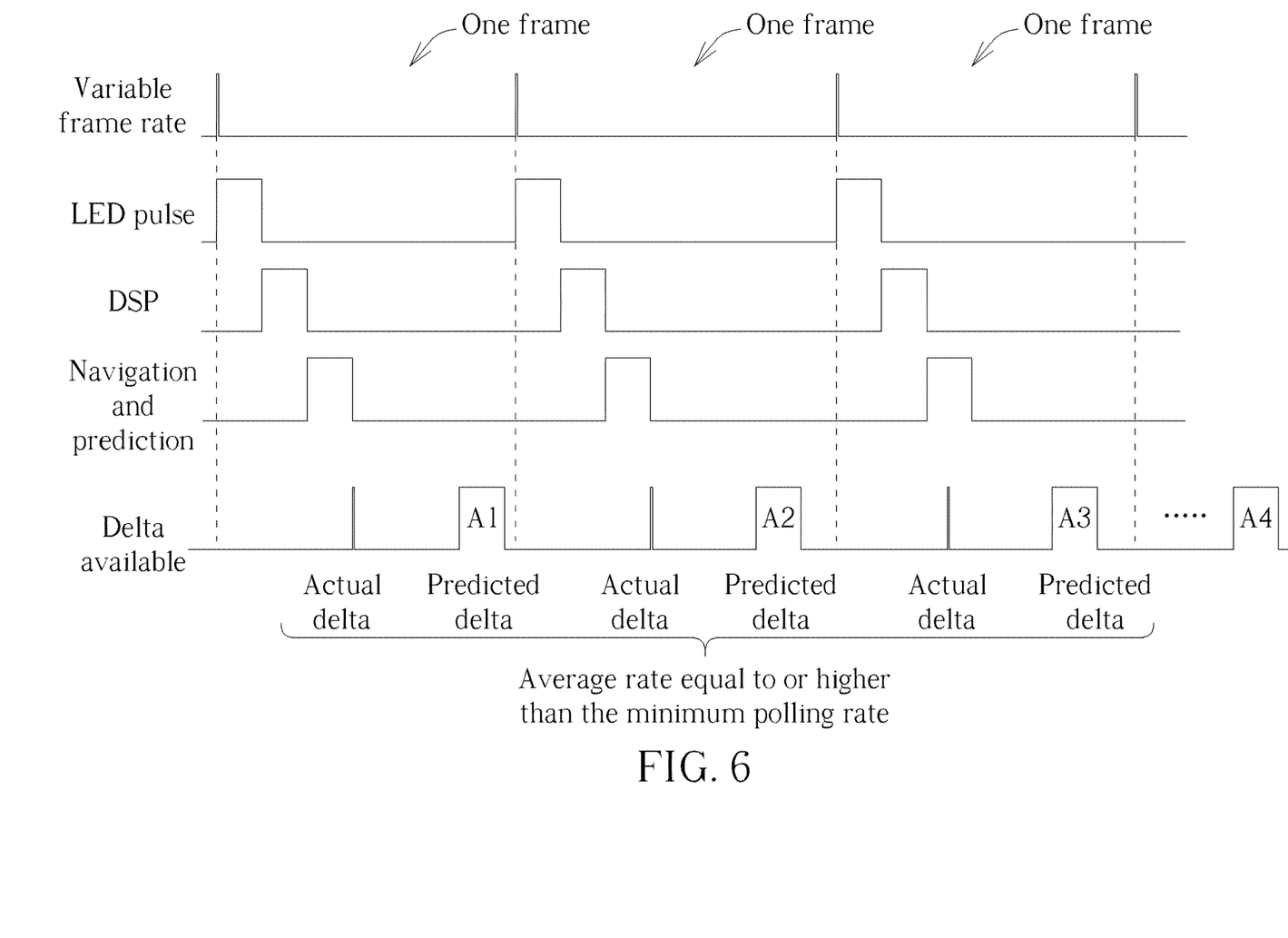
FIG. 6 is a diagram showing a fifth of the optical navigation device of FIG. 1 operating under a high speed tracking mode (or power saving mode) according to an embodiment of the invention.

In another embodiment, to make the resultant delta data stored in the buffer 1103 be updated and available at the minimum required polling rate such as 1 KHz at least, the optical sensor device 110 may predict and generate the delta values for the buffer 1103 for different frames at different times. Please refer to FIG. 5 and FIG. 6. FIG. 5 is a diagram showing another example of the optical navigation device 100 predicting and generating delta values for A1 times and A2 times respectively for different frames such as any two consecutive frames (but not limited) according to an embodiment of the invention. FIG. 6 is a diagram showing the operation of the optical navigation device 100 predicting and generating delta values for different times (A1-A4) for different frames according to an embodiment of the invention.

As shown in FIG. 5, for example, the processing circuit 1102 may predict and generate delta values during the time period between the start and end of a first frame F1 for A1 times and may predict and generate the delta values during the time period between the start and end of a second frame F2 for A2 times. The integers A1 and A2 are different and in this example the second frame F2 follows the first frame F1 or in another example may be after the first frame F1 but directly follow the first frame F1. As shown in FIG. 5, the optical sensor device 110 is arranged to predict and generate the delta values respectively for A1 and A2 times for any two consecutive frames. It should be noted that the processing circuit 1102 is arranged to generate the estimated delta values periodically for A1 or A2 times during the time length between the end of navigation engine's execution of a frame and the end of such frame. For example, the A1 sets of predicted delta values may be averagely or non-averagely distributed over the time length between the end of navigation engine's execution of the frame F1 and the end of such frame F1. The A2 sets of predicted delta values may be averagely or non-averagely distributed over the time length between the end of navigation engine's execution of the frame F1 and the end of such frame F2.

As shown in FIG. 6, for example, the processing circuit 1102 may predict and generate the delta values during the time period between the start and end of a first frame for A1 times, predict and generate the delta values during the time period between the start and end of a second frame for A2 times, predict and generate the delta values during the time period between the start and end of a third frame for A3 times, predict and generate the delta values during the time period between the start and end of a fourth frame for A4 times, and so on. The integers A1 to A4 may be different, partially different, or may be identical; this is not meant to be a limitation of the invention. For each frame, the multiple sets of predicted delta values having different numbers may be averagely or non-averagely distributed over the time length between the end of navigation engine's execution of the each frame and the end of such each frame. It should be noted that an integer among A1-A4 and following integers may be zero; that is, the processing circuit 1102 may insert more sets of predicted delta values for a frame and insert no predicted delta values for another different frame. This medication also falls within the scope of the invention. That is, in some situations, it is possible that no predicted delta values (i.e. no predicted displacement data) are generated and inserted between two sets of actual delta values associated with two frames. Further, the rate of generating the actual delta value plus generating the predicted delta values is an average rate which is equal to (matched to) or higher than the minimum polling rate so that the motion of the optical navigation device 100 can be effectively and precisely tracked as well as the current consumption of the battery can be significantly reduced. Thus, more power can be saved when the optical navigation device 100 moves slowly in either the high speed tracking mode or the power saving mode.

Further, the operation of generating the predicted delta/displacement data can be performed by predicting the moving speed of the optical navigation device 100 to interpolate or extrapolate the predicted delta/displacement data based on the previously estimated displacement data, a portion of actual displacement data (generated from the captured image(s)), and/or the variable frame rate which is previously adjusted, or any combinations of predicted data, actual data, and frame rate. Alternatively, in other embodiments, the operation of generating the predicted delta/displacement data may be performed by predicting the moving speed of the optical navigation device 100 to interpolate or extrapolate the predicted displacement data based on motion detected in previous frame(s) (i.e. a portion of the actual displacement data corresponding to the image frames captured by the optical sensor device 110) and/or the variable frame rate which is previously adjusted. Further, the optical sensor device 110 may be used to generate a set of predicted delta values of X-axis and Y-axis according to differences/averages of at least two sets of actual delta values of X-axis and Y-axis. All the modifications of predicting the delta data to save power should also obey the spirit of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device, used to communicate with a remote computer device based on a transmission interface, comprising:
   a controller, coupled to the remote computer device via the transmission interface, for outputting resultant displacement data generated by an optical sensor device to the remote computer device based on a specific reporting rate specified by the transmission interface; and
   the optical sensor device, coupled to the controller, for generating the resultant displacement data according to a specific frame rate and then outputting the resultant displacement data to the controller;
   wherein the specific frame rate is lower than the specific reporting rate specified by the transmission interface; and, the optical sensor device is capable of capturing image frames according to the specific frame rate to obtain actual displacement data corresponding to the captured image frames, generating predicted displacement data based on the actual displacement data, and using the actual displacement data and the predicted displacement data to form the resultant displacement data which is to be outputted to the controller; the optical sensor device is arranged to generate and insert a set of predicted displacement data between at least two consecutive sets of actual displacement data generated due to the image frames captured by the optical sensor device.

2. The optical navigation device of claim 1, wherein the optical sensor device is arranged for extrapolating the predicted displacement data by predicting a moving speed of the optical navigation device based on the specific frame rate and a portion of the actual displacement data corresponding to the image frames captured by the optical sensor device.

3. The optical navigation device of claim 1, wherein the optical sensor device is arranged for generating a set of predicted displacement data of X-axis and Y-axis according to differences/averages of at least two sets of actual displacement data of X-axis and Y-axis.

4. The optical navigation device of claim 1, further comprising:
   a light emitting unit, for emitting/flashing light to a surface on which the optical navigation device moves with a specific flash rate which is lower than the specific reporting rate of the transmission interface; and
   the optical sensor device comprises:
   a sensing unit, for receiving and sensing reflected light from the surface to capture frame(s); and
   a processing circuit, coupled to the light emitting unit, for generate actual displacement data and generating predicted displacement data.

5. The optical navigation device of claim 4, wherein at least one set of predicted displacement data is generated and inserted between a first set of actual displacement data and a second set of actual displacement data, and no predicted displacement data are generated and inserted between the second set of actual displacement data and a third set of actual displacement data.

6. The optical navigation device of claim 5, wherein the third set of actual displacement data is a set of actual displacement data, which follows the second set of actual displacement data.

7. An optical sensor device, to be used in an optical navigation device which is used to communicate with a remote computer device based on a transmission interface, comprising:

a sensing unit, for receiving and sensing reflected light from a surface on which the optical navigation device moves with a specific flash rate which is lower than a specific reporting rate of the transmission interface; and a processing circuit, coupled to the light emitting unit, for capturing image frames with a specific frame rate to generate actual displacement data and generating predicted displacement data to form resultant displacement data which are to be outputted from the optical navigation device to the remote computer device;

wherein the processing circuit is arranged to generate and insert a set of predicted displacement data between at least two consecutive sets of actual displacement data generated due to the image frames captured by the optical sensor device.

8. The optical sensor device of claim 7, wherein the specific frame rate is lower than the specific reporting rate specified by the transmission interface; and, the processing circuit is arranged for capturing the image frames according to the specific frame rate to obtain actual displacement data corresponding to the captured image frames, generating predicted displacement data based on the actual displacement data, and using the actual displacement data and the predicted displacement data to form the resultant displacement data which are to be outputted from the optical navigation device.

9. The optical sensor device of claim 8, wherein the processing circuit is arranged for extrapolating the predicted displacement data by predicting a moving speed of the optical navigation device based on the specific frame rate and a portion of the actual displacement data corresponding to the image frames captured by the optical sensor device.

10. The optical sensor device of claim 8, wherein the processing circuit is arranged for generating a set of predicted displacement data of X-axis and Y-axis according to differences/averages of at least two sets of actual displacement data of X-axis and Y-axis.

11. The optical sensor device of claim 8, wherein at least one set of predicted displacement data is generated and inserted between a first set of actual displacement data and a second set of actual displacement data, and no predicted displacement data are generated and inserted between the second set of actual displacement data and a third set of actual displacement data.

12. The optical sensor device of claim 11, wherein the third set of actual displacement data is a set of actual displacement data, which follows the second set of actual displacement data.

13. A method applied into an optical navigation device, used to communicate with a remote computer device based on a transmission interface, and the method comprises:

capturing image frames according to a specific frame rate to obtain actual displacement data corresponding to the captured image frames, the specific frame rate being lower than a specific reporting rate specified by the transmission interface;

generating predicted displacement data based on the actual displacement data;

using the actual displacement data and the predicted displacement data to form resultant displacement data which is to be outputted; and outputting the resultant displacement data to the remote computer device based on the specific reporting rate specified by the transmission interface;

wherein the step of generating the predicted displacement data comprises:

generating and inserting a set of predicted displacement data between at least two consecutive sets of actual displacement data generated due to the image frames captured by the optical sensor device.

14. The method of claim 13, wherein the step of generating the predicted displacement data comprises:

extrapolating the predicted displacement data by predicting a moving speed of the optical navigation device based on the specific frame rate and a portion of the actual displacement data corresponding to the image frames captured by the optical sensor device.

15. The method of claim 13, wherein the step of generating the predicted displacement data comprises:

generating a set of predicted displacement data of X-axis and Y-axis according to differences/averages of at least two sets of actual displacement data of X-axis and Y-axis.

16. The method of claim 13, wherein the step of generating the predicted displacement data comprises:

generating and inserting at least one set of predicted displacement data between a first set of actual displacement data and a second set of actual displacement data, wherein no predicted displacement data are generated and inserted between the second set of actual displacement data and a third set of actual displacement data.

17. The method of claim 16, wherein the third set of actual displacement data is a set of actual displacement data, which follows the second set of actual displacement data.

* * * * *